United States Patent
Choi et al.

(10) Patent No.: US 8,659,988 B2
(45) Date of Patent: *Feb. 25, 2014

(54) OFDM APPARATUS USING THREE-DIMENSIONAL HEXADECIMAL SIGNAL CONSTELLATION

(75) Inventors: Eunchang Choi, Daejeon (KR); Seoggeun Kang, Jinju-si (KR); Jaedoo Huh, Daejeon (KR); Euihyun Paik, Daejeon (KR)

(73) Assignees: Electronics and Telecommunications Research Institute, Daejeon (KR); Industry-Academic Cooperation Foundation Gyeongsang National University, Jinju-Si (KR)

( * ) Notice: Subject to any disclaimer, the term of this patent is extended or adjusted under 35 U.S.C. 154(b) by 88 days.

This patent is subject to a terminal disclaimer.

(21) Appl. No.: 13/386,661

(22) PCT Filed: Aug. 20, 2010

(86) PCT No.: PCT/KR2010/005539
§ 371 (c)(1),
(2), (4) Date: Jan. 23, 2012

(87) PCT Pub. No.: WO2011/021890
PCT Pub. Date: Feb. 24, 2011

(65) Prior Publication Data
US 2012/0140614 A1    Jun. 7, 2012

(30) Foreign Application Priority Data
Aug. 20, 2009  (KR) .................. 10-2009-0077215

(51) Int. Cl.
*H04J 11/00* (2006.01)

(52) U.S. Cl.
USPC ......................................................... 370/208

(58) Field of Classification Search
None
See application file for complete search history.

(56) References Cited

U.S. PATENT DOCUMENTS

| | | | | |
|---|---|---|---|---|
| 7,991,070 | B2 * | 8/2011 | Batshon et al. | 375/295 |
| 8,018,829 | B2 * | 9/2011 | Choi et al. | 370/203 |
| 2005/0089125 | A1 | 4/2005 | Zhidkov | |
| 2009/0245401 | A1 | 10/2009 | Chrabieh et al. | |
| 2010/0020675 | A1 | 1/2010 | Choi et al. | |

(Continued)

FOREIGN PATENT DOCUMENTS

| | | |
|---|---|---|
| EP | 1 694 021 A1 | 8/2006 |
| KR | 1020100011639 A | 2/2010 |
| KR | 10-2010-0034268 A | 4/2010 |

OTHER PUBLICATIONS

Zhenxing Chen and Seog Geun Kang, Probability of SYmbol Error of OFDM System with 3-Dimensional Signal Constellations, ISCE2009, pp. 442-446.*

(Continued)

*Primary Examiner* — Mark Rinehart
*Assistant Examiner* — Peter Solinsky (57) ABSTRACT

A three-dimensional OFDM apparatus of the present invention comprises: a serial-parallel conversion unit for converting a serial input signal into N parallel input signals; a three-dimensional signal mapping unit for mapping the N parallel input signals on three-dimensional coordinates of a cube-in-cube type constellation, respectively; and a two-dimensional inverse Fourier transform unit for performing an inverse Fourier transform by generating a two-dimensional matrix on the basis of the mapped three-dimensional coordinates.

10 Claims, 11 Drawing Sheets

(56) References Cited

U.S. PATENT DOCUMENTS

2012/0051452 A1* 3/2012 Djordjevic et al. ........... 375/295
2012/0263251 A1* 10/2012 Djordjevic et al. ........... 375/261
2012/0294240 A1* 11/2012 Nakano et al. ................ 370/328

OTHER PUBLICATIONS

Zijing Zhang, Eun Chang Choi, and Seog Geun Kang, Trellis Coded e-Dimensional OFDM System.*

Three-Dimensional Spherical Signal Constellation for Few-Mode Fiber based High-Speed Optical Transmission, Jianyong Zhang and Ivan B. Djordjevic, CLEO Technical Digest, 2012.*

Seog Geun Kang, An OFDM with 3-D Signal Mapper and 2-D IDFT Modulator, IEEE Communications Letters, vol. 12, No. 12, Dec. 2008, pp. 871-873.*

Three-Dimensional Spherical Signal Constellation for Few-Mode Fiber based High-Speed Optical Transmission, Zhang, Jianyong and Djordjevic, Ivan B. CLEO Technical Digest, 2012.*

An OFDM wtih 3-D Signal Mapper and 2-D IDFT Modulator, Kang, Seog Geun, IEEE Communications Letters, vol. 12, No. 12, Dec. 2008, pp. 871-873.*

Trellis Coded 3-Dimensional OFDM System, Zhang, Zijing, Choi, Eun Chang, Kang, Seog Geun, 978-1-4244-4522-6/09/$25.00 © 2009 IEEE.*

Probability of Symbol Error of OFDM System with 3-Dimensional Signal Constellations, Chen, Zhenxing and Kang, Seog Geun, the 13th IEEE International Symposium on Consumer Electronics (ISCE2009), pp. 442-446.*

Eun Chang Choi et al., "A New Design of OFDM for Ultra-Wideband Systems", 2009, IEEE.

Seog Geun Kang, "An OFDM with 3-D Signal Mapper and 2-D IDFT Modulator", IEEE Communications Letters, Dec. 2008, pp. 871-873, vol. 12 No. 12, IEEE.

Lee-Fang Wei, "Trellis-Coded Modulation with Multidimensional Constellations," IEEE Transactions on Information Theory, Jul. 1987, pp. 483-501, vol. IT-33, No. 4.

G. David Forney, Jr. "Multidimensional Constellations—Part II: Voronoi Constellations," IEEE Journal on Selected Areas in Communications, Aug. 1989, pp. 941-958, vol. 7, No. 6.

* cited by examiner

| NUMBER OF SIGNALING POINTS=4 | | | |
|---|---|---|---|
| SYMBOL OF SIGNALING POINTS | VALUE OF X-AXIS COORDINATE | VALUE OF Y-AXIS COORDINATE | VALUE OF Z-AXIS COORDINATE |
| $S_0$ | 0 | 0 | 1 |
| $S_1$ | $-\sqrt{2}/3$ | $-\sqrt{6}/3$ | $-1/3$ |
| $S_2$ | $2\sqrt{2}/3$ | 0 | $-1/3$ |
| $S_3$ | $-\sqrt{2}/3$ | $\sqrt{6}/3$ | $-1/3$ |

| NUMBER OF SIGNALING POINTS=8 | | | |
|---|---|---|---|
| SYMBOL OF SIGNALING POINTS | VALUE OF X-AXIS COORDINATE | VALUE OF Y-AXIS COORDINATE | VALUE OF Z-AXIS COORDINATE |
| $S_0$ | $\sqrt{3}/3$ | $-\sqrt{3}/3$ | $\sqrt{3}/3$ |
| $S_1$ | $\sqrt{3}/3$ | $\sqrt{3}/3$ | $\sqrt{3}/3$ |
| $S_2$ | $-\sqrt{3}/3$ | $\sqrt{3}/3$ | $\sqrt{3}/3$ |
| $S_3$ | $-\sqrt{3}/3$ | $-\sqrt{3}/3$ | $\sqrt{3}/3$ |
| $S_4$ | $\sqrt{3}/3$ | $-\sqrt{3}/3$ | $-\sqrt{3}/3$ |
| $S_5$ | $\sqrt{3}/3$ | $\sqrt{3}/3$ | $-\sqrt{3}/3$ |
| $S_6$ | $-\sqrt{3}/3$ | $\sqrt{3}/3$ | $-\sqrt{3}/3$ |
| $S_7$ | $-\sqrt{3}/3$ | $-\sqrt{3}/3$ | $-\sqrt{3}/3$ |

OFDM APPARATUS USING THREE-DIMENSIONAL HEXADECIMAL SIGNAL CONSTELLATION

TECHNICAL FIELD

The present invention relates to an apparatus for 3-dimensional orthogonal frequency division multiplexing and a method for implementing a 3-dimensional signal constellation used for the same. More particularly, the present invention relates to an apparatus for orthogonal frequency division multiplexing using 3-dimensional 16-ary signal constellation, which correspond binary bit sequence to each other, to allow the binary bit sequence generated from an information source to have different amplitudes and phases prior to being modulated into a radio frequency and a method for implementing 3-dimensional 16-ary signal constellation.

BACKGROUND ART

An orthogonal frequency division multiplexing (OFDM) scheme divides one high-speed data stream into a plurality of low-speed data streams and simultaneously transmits a plurality of low-speed data streams by using subcarriers that are orthogonal to each other, thereby making it possible to increase transmission efficiency. A technology of the apparatus for orthogonal frequency division multiplexing is developed to a current scheme using 2-D signal constellation and 1-D inverse fast Fourier transform in the early 1980's and has been prevalently used for a wireless communication apparatus or a mobile communication apparatus. The signal constellation is a set of signal points and is for transforming the binary bit sequence generated from the information source into signals which have different amplitudes and phases from each other prior to being modulated into radio frequency.

Figure 1:
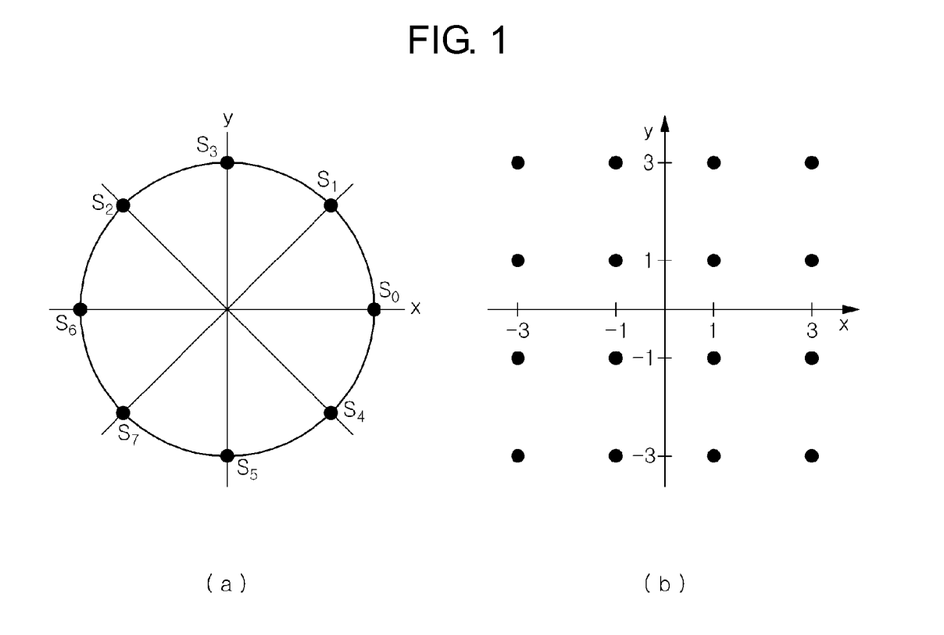
FIG. 1 is a diagram showing 2-D signal constellation used in existing digital communication or a wireless communication system.
Figure 2:
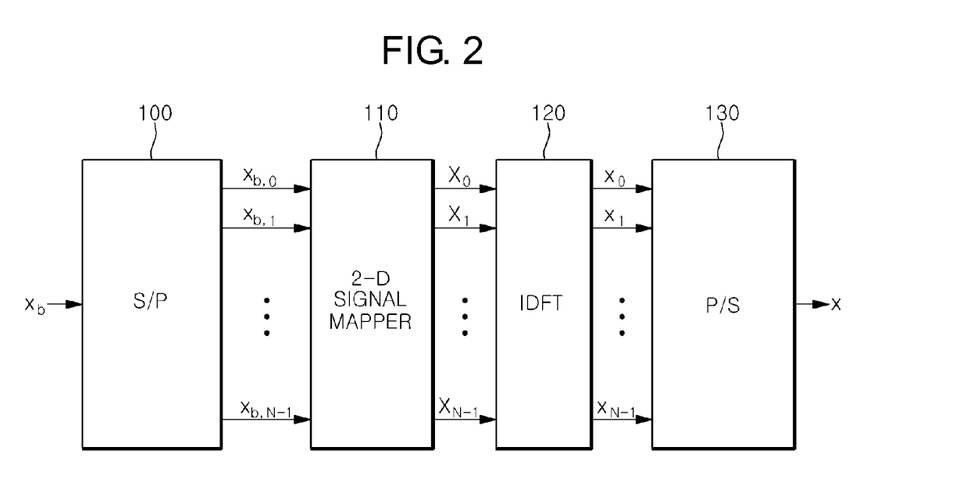
FIG. 2 is a diagram for explaining an apparatus for orthogonal frequency division multiplexing to use the existing 2-D signal constellation for signal mapping.

FIG. 1 is a diagram showing 2-D signal constellation used in existing digital communication or a wireless communication system. In more detail, FIG. 1A shows an example of constant amplitude constellation where all the signal points configuring the signal constellation have the same amplitude and FIG. 1B is a diagram showing non-constant amplitude characteristics as 16-ary quadrature amplitude modulation (QAM) constellation where 16 signal points have different amplitudes and phases. FIG. 2 is a diagram for explaining an apparatus for orthogonal frequency division multiplexing to use the existing 2-D signal constellation for signal mapping.

Referring to FIG. 2, the apparatus for orthogonal frequency division multiplexing using the existing 2-D signal constellation includes a serial-to-parallel converter 110, a 2-D signal mapper 120 that is configured by 2-D signal constellation, an inverse discrete Fourier transform unit (IDFT) 130, and a parallel-to-serial converter 140, as shown in FIG. 2.

The serial-to-parallel converter 110 parallelizes serial binary bit sequence input. The 2-D signal mapper 120 maps the parallelized input signals to the signal points of 2-D signal constellation, respectively. The input signals are changed into N complex values corresponding to the signal points of the 2-D signal constellation and are then modulated in the inverse Fourier converter 130, as in the following Equation 1. Next, the modulated N complex values are serialized by the parallel-to-serial converter 140 and are then transmitted.

$$x_n = \frac{1}{N}\sum_{k=0}^{N-1} X_k \exp(i2\pi nk/N) \quad \text{[Equation 1]}$$

In Equation 1, $0 \le n \le N-1$. Where N represents the number of sub-channels used in the apparatus for orthogonal frequency division multiplexing and k represents each sub-channel.

Meanwhile, in the case of the apparatus for orthogonal frequency division multiplexing using the existing 2-D signal constellation, it has been used for the plurality of wireless communication apparatus or the mobile communication apparatus without being almost changed until now after being devised in the approximately same type as the current apparatus in the early 1980's. Therefore, a need exists for a new apparatus for orthogonal frequency division multiplexing capable of showing more excellent performance in view of a symbol error rate and remarkably reducing transmission power required to achieve the same reference symbol error rate, as compared to an apparatus for orthogonal frequency division multiplexing using 2-D signal constellation.

DISCLOSURE

Technical Problem

The present invention proposes to solve the above problems.

There has been made in an effort to provide an apparatus for orthogonal frequency division multiplexing capable of showing more excellent performance in view of a symbol error rate and remarkably reducing transmission power required to achieve the same reference symbol error rate, as compared to the existing apparatus for orthogonal frequency division multiplexing using 2-D signal constellation for signal mapping, and a method for implementing 3-D signal constellation used for the same.

In particular, there has been made in an effort to provide a method for implementing 3-D 16-ary signal constellation capable of allocating 4 bits to each sub-channel of orthogonal frequency division multiplexing by using basic type 3-D signal constellation (advantageous in high-speed data transmission).

Technical Solution

An exemplary embodiment of the present invention provides an apparatus for 3-D orthogonal frequency division multiplexing, including: a serial-to-parallel converter that parallelizes a serial input signal into N parallel input signals; a 3-D signal mapper that maps the N parallel input signals to 3-D coordinate points of a cube-in-cube signal constellation, respectively; and a 2-D inverse discrete Fourier transform unit that generates a 2-D matrix based on the N mapped 3-D coordinate points and performs inverse discrete Fourier transform.

The cube-in-cube signal constellation is 16-ary cube-in-cube signal constellation.

The cube-in-cube signal constellation has the non-constant amplitude characteristics.

The cube-in-cube signal constellation is 16-ary 3-D cube-in-cube signal constellation having 16 signal points corresponding to an inner regular hexahedron and an outer regular hexahedron, both of them having a central point of a 3-D orthogonal coordinate system as a center of gravity.

The signal point of the outer regular hexahedron is located on 8 straight lines each of which connects the center of gravity with one signal points of the inner regular hexahedron.

The apparatus for 3-D orthogonal frequency division multiplexing further includes a parallel-to-serial converter that converts and outputs the inverse discrete Fourier transformed parallel signals into serial signals.

Another exemplary embodiment of the present invention provides an apparatus for 3-D orthogonal frequency division multiplexing, including: a serial-to-parallel converter that parallelizes a serial input signal into N parallel input signals; a 3-D signal mapper that maps the N parallel input signals to 3-D coordinate points of a concatenated tetrahedron signal constellation, respectively; and a 2-D inverse discrete Fourier transform unit that generates a 2-D matrix based on the N mapped 3-D coordinate points and performs 2-D inverse discrete Fourier transform(2-D IDFT).

The concatenated tetrahedron signal constellation has non-constant amplitude characteristics.

The concatenated tetrahedron signal constellation is 16-ary 3-D cube-in-cube signal constellation having 16 signal points corresponding to an inner regular tetrahedron and four outer regular tetrahedrons each of which shares one vertex with the inner regular tetrahedron and has a center of gravity positioned at the outside of the inner regular tetrahedron, the inner regular tetrahedron having a central point of a 3-D orthogonal coordinate system as a center of gravity.

The distance between the signal point belonging to any one outer regular tetrahedron and the signal point belonging to other outer regular tetrahedron among the 4 outer regular tetrahedrons is equal to or longer than the distance between the signal points in the any one outer regular tetrahedron.

Advantageous Effects

The following effects can be obtained by the present invention.

The present invention can show more excellent performance in view of a symbol error rate and remarkably reduce transmission power required to achieve the same reference symbol error rate, as compared to the existing apparatus for orthogonal frequency division multiplexing using 2-D signal constellation for signal mapping.

In addition, the present invention can implement the 3-D 16-ary signal constellation capable of allocating 4 bits to each sub-channel of the orthogonal frequency division multiplexing by using the basic type 3-D signal constellation, without using the complicated Equations.

BEST MODE

The present invention will be described below with reference to the accompanying drawings. Herein, the detailed description of a related known function or configuration that may make the purpose of the present invention unnecessarily ambiguous in describing the present invention will be omitted exemplary embodiments of the present invention are provided so that those skilled in the art may more completely understand the present invention. Accordingly, the shape, the size, etc., of elements in the drawings may be exaggerated for explicit comprehension.

Hereinafter, exemplary embodiments of the present invention will be described in detail with reference to the accompanying drawings.

Figure 3:
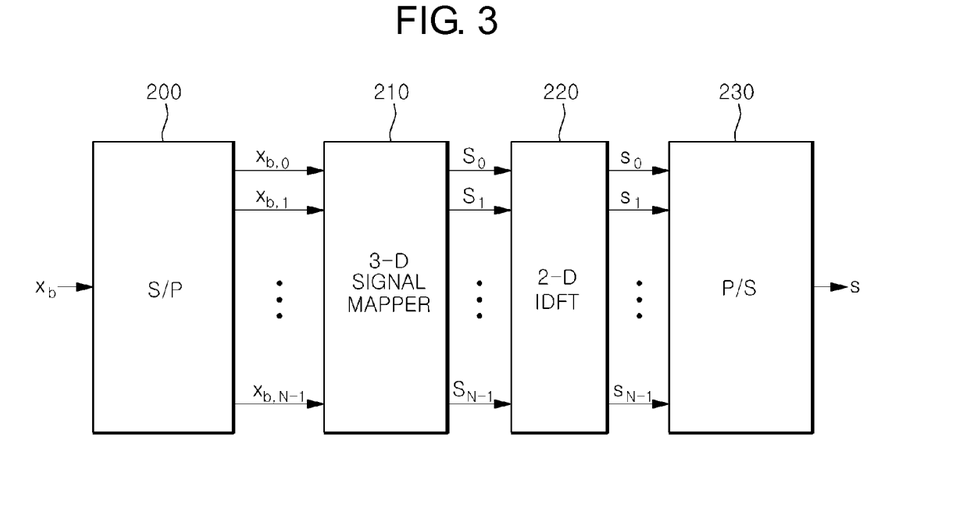
FIG. 3 is a block diagram for explaining an apparatus for 3-D orthogonal frequency division multiplexing according to an exemplary embodiment of the present invention.

FIG. 3 is a block diagram for explaining a configuration of a transmitting side of the apparatus for 3-D orthogonal frequency division multiplexing according to an exemplary embodiment of the present invention.

Referring to FIG. 3, an apparatus for 3-D orthogonal frequency division multiplexing according to an exemplary embodiment of the present invention includes a serial-to-parallel converter 200, a 3-D signal mapper 210, a 2-D inverse discrete Fourier transform unit (2-D IDFT) 220, and a parallel-to-serial converter 230.

The serial-to-parallel converter (S/P) 200 parallelizes ($x_{b,0}$, $x_{b,1}, \ldots x_b, x_{b,N-1}$) a serial binary bit sequence input ($x_b$) to be allocated to sub-channels of N orthogonal frequency division multiplexing. That is, the serial-to-parallel converter 200 converts the serial binary bit sequence input $x_b$ into N parallel binary bit sequence that is the number of sub-channels of the orthogonal frequency division multiplexing. The length of each parallel binary bit sequence is calculated according to the following Equation 2.

$$N_b = \log_2 N_s \text{(Unit:bit)} \qquad \text{[Equation 2]}$$

Where $N_s$ represents the number of signal points configuring the signal constellation and $N_b$ represents the number of bits transmittable by each signal point. For example, when the signal point is 8, 3 bits can be transmitted by each signal point and when the signal point is 16, 4 bits can be transmitted by each signal point.

The 3-D signal mapper 210 maps the binary bit sequence parallelized by the serial-to-parallel converter 200 to each of the signal point of the 3-D signal constellation, which are changed into N complex values. The 3-D signal mapper 210 may map the parallelized binary bit sequence to each signal point by using the 3-D signal constellation shown in any one of FIGS. 4, 6, 11, and 13. The signal constellation applied to the 3-D signal mapper 210 will be described in detail with reference to the following description.

The 3-D signal mapper 210 converts the generated N vectors into 2-D matrix according to 3-axial coordinate values x, y, and z as in the following Equation 3.

$$S(k_1, k_2) = \begin{pmatrix} x_0 & x_1 & \ldots & x_{N-1} \\ y_0 & y_1 & \ldots & y_{N-1} \\ z_0 & z_1 & \ldots & z_{N-1} \end{pmatrix} \quad \text{[Equation 3]}$$

As represented in Equation 3, each column in the 2-D matrix corresponds to N 3-D coordinate values. k1, k2 values are used in 2-D inverse discrete Fourier transform unit 220. The reason of converting the complex 3-D coordinate values into the 2-D matrix is to perform the inverse Fourier transform.

The 2-D inverse discrete Fourier transform unit 220 performs fast inverse discrete Fourier transform (IDFT) on N 3-dimensional coordinate values represented in a 2-D matrix by using the following Equation 4.

$$S(n_1, n_2) = \frac{1}{N_1 N_2} \sum_{k_2=0}^{N_2-1} \sum_{k_1=0}^{N_1-1} S(k_1, k_2) \exp\left[i2\pi\left(\frac{n_2 k_2}{N_2} + \frac{n_1 k_1}{N_1}\right)\right] \quad \text{[Equation 4]}$$

$$= \frac{1}{N_1 N_2} \sum_{k_2=0}^{N_2-1} \exp(i2\pi n_2 k_2 / N_2)$$

$$\left[\sum_{k_1=0}^{N_1-1} S(k_1, k_2) \exp(i2\pi n_1 k_1 / N_1)\right]$$

In Equation 4, $N_1$ and $N_2$ each are the same as the number of columns and rows in the matrix of Equation 3.

The parallel-to-serial converter (P/S) 230 serially converts N 3-D coordinate values, which are subjected to the inverse discrete Fourier transform (IDFT) by the 2-D inverse discrete Fourier transform unit 220 and outputs them.

Figure 4:
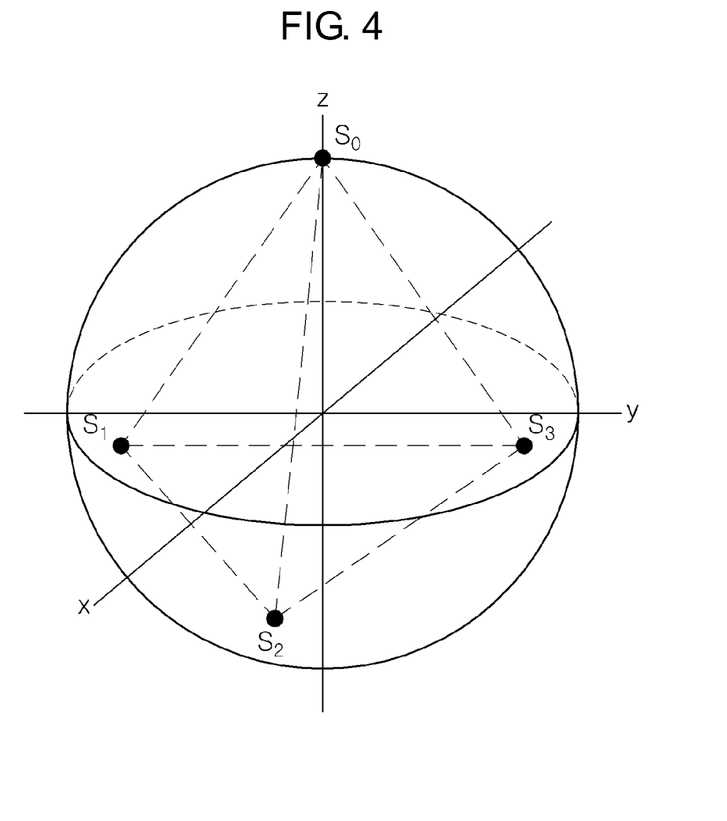
FIG. 4 is a diagram showing 3-D 4-lay signal constellation using four vertices of a regular tetrahedron inscribing to a sphere as signal points.
Figure 5:
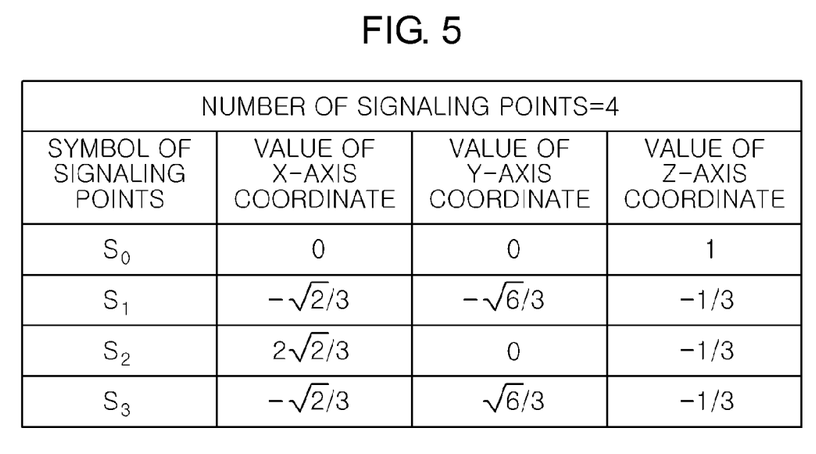
FIG. 5 is a diagram showing 3-D coordinate values for four signal points of the 3-D 4-lay signal constellation of FIG. 4.
Figure 6:
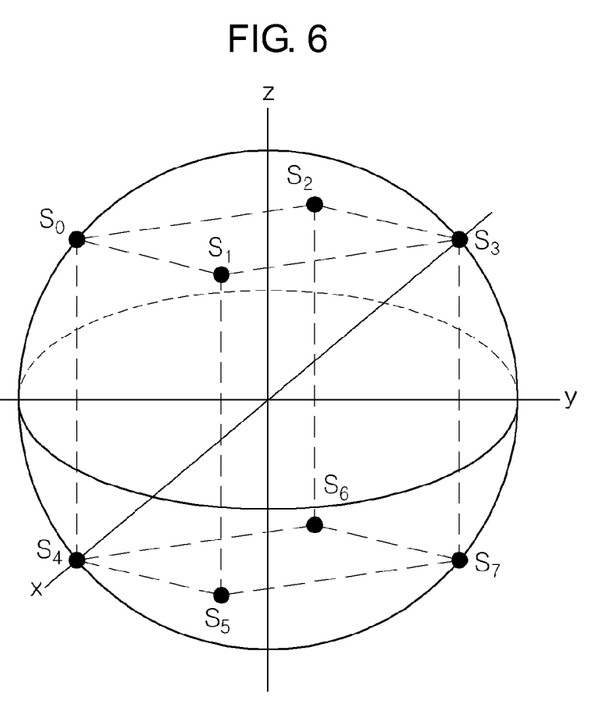
FIG. 6 is a diagram showing 3-D 8-lay signal constellation using eight vertices of a regular hexahedron inscribing to a sphere as signal points.

FIG. 4 is a diagram showing 3-D 4-lay signal constellation using four vertices of a regular tetrahedron inscribing to a sphere as signal points and FIG. 5 is a diagram showing 3-D coordinate values for four signal points of the 3-D 4-lay signal constellation of FIG. 4. FIG. 6 is a diagram showing 3-D 8-lay signal constellation using eight vertices of a regular hexahedron inscribing to a sphere as signal points and FIG. 7 is a diagram showing 3-D coordinate values for eight signal points of the 3-D 8-lay signal constellation of FIG. 6.

When using the 3-D 4-lay signal constellation shown in FIG. 4, the apparatus for orthogonal frequency division multiplexing of FIG. 3 may allocate 2 bits to each sub-channel and the coordinate values thereof are shown in FIG. 5.

Figure 7:
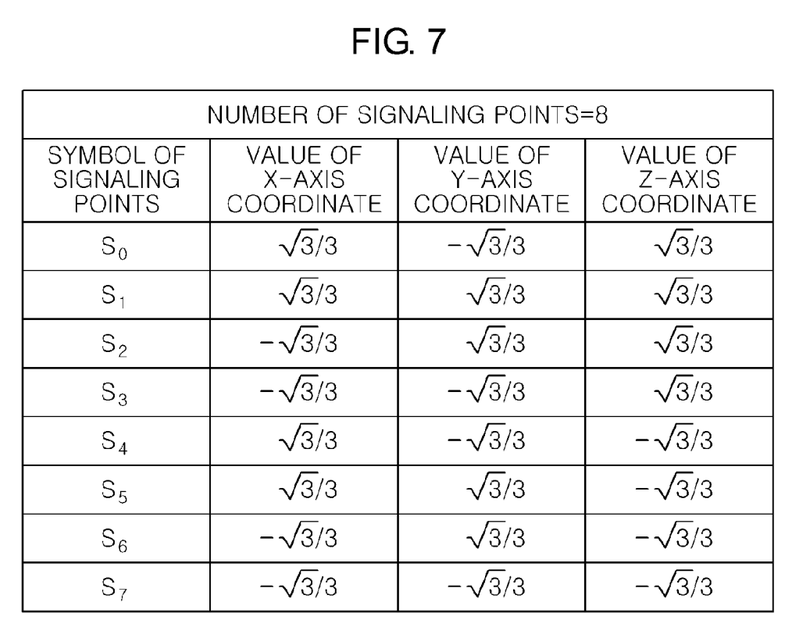
FIG. 7 is a diagram showing 3-D coordinate values for eight signal points of the 3-D 8-lay signal constellation of FIG. 6.

When using the 3-D 8-lay signal constellation shown in FIG. 6, the apparatus for orthogonal frequency division multiplexing of FIG. 3 may allocate 3 bits to each sub-channel and the coordinate values thereof are shown in FIG. 7.

Figure 8:
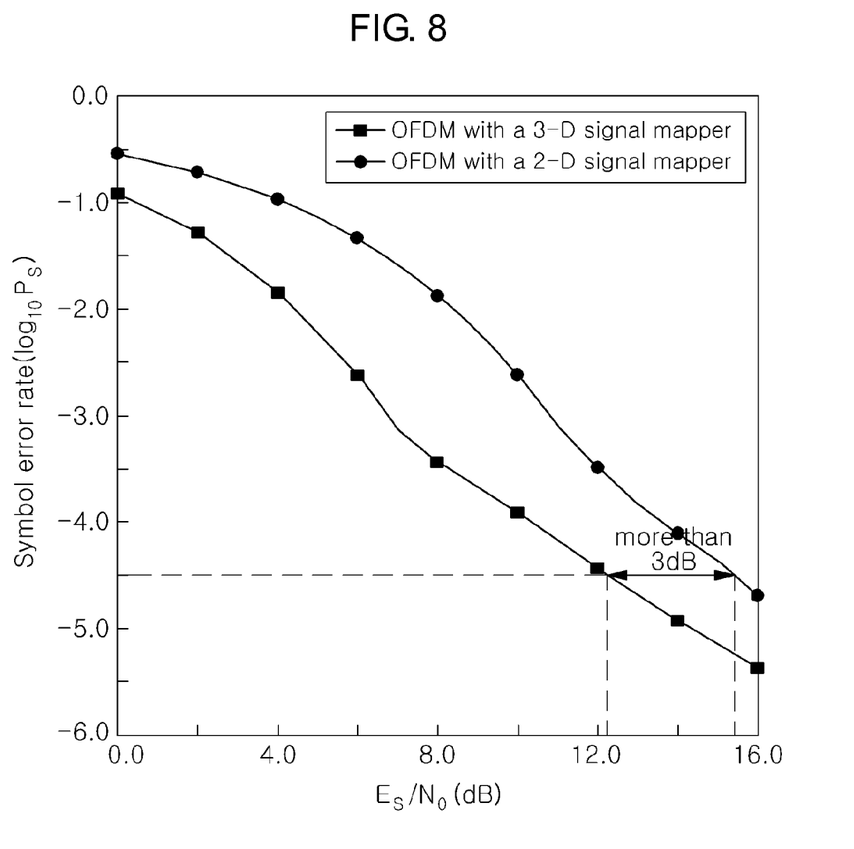
FIG. 8 is a graph comparing a symbol error rate of the apparatus for orthogonal frequency division multiplexing of FIG. 3 using 3-D 4-lay signal constellation of FIG. 4 with a symbol error rate of the apparatus for orthogonal frequency division multiplexing of FIG. 2 using the existing 2-D signal constellation of FIG. 1.

FIG. 8 is a graph comparing a symbol error rate of the apparatus for orthogonal frequency division multiplexing of FIG. 3 using 3-D 4-lay signal constellation of FIG. 4 with a symbol error rate of the apparatus for orthogonal frequency division multiplexing of FIG. 2 using the existing 2-D signal constellation of FIG. 1.

In the case of the apparatus for orthogonal frequency division multiplexing of FIG. 2 using the existing 2-D signal constellation of FIG. 1, a signal to noise ratio $E_S/N_0$, to achieve symbol error rate $P_s=10^{-4.5}$ (−4.5 when being represented in a log type) is 15.3 dB.

On the other hand, in the case of the apparatus for orthogonal frequency division multiplexing of FIG. 3 using the 3-D 4-lay signal constellation of FIG. 4, a signal to noise ratio $E_S/N_0$ to achieve symbol error rate $P_s=10^{-4.5}$ is 12.2 dB. Therefore, it can be confirmed that the transmission power is reduced by about 3 dB in a transmitter.

Figure 9:
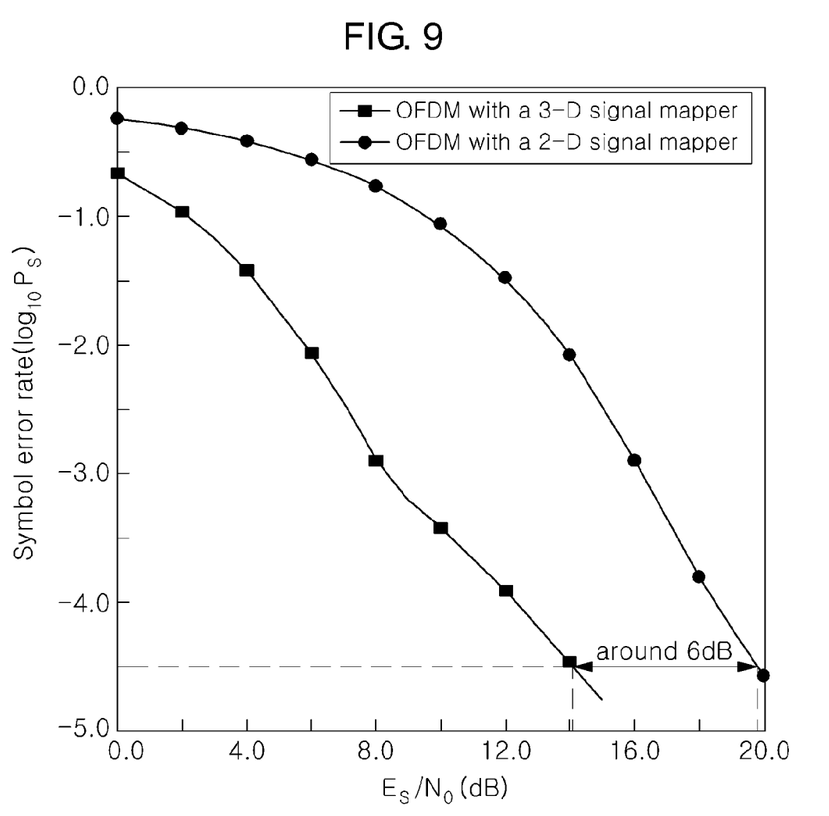
FIG. 9 is a graph comparing a symbol error rate of the apparatus for orthogonal frequency division multiplexing of FIG. 3 using 3-D 8-lay signal constellation of FIG. 6 with a symbol error rate of the apparatus for orthogonal frequency division multiplexing of FIG. 2 using the existing 2-D signal constellation of FIG. 1.

FIG. 9 is a graph comparing a symbol error rate of the apparatus for orthogonal frequency division multiplexing of FIG. 3 using 3-D 8-lay signal constellation of FIG. 6 with a symbol error rate of the apparatus for orthogonal frequency division multiplexing of FIG. 2 using the existing 2-D signal constellation of FIG. 1.

In the case of the apparatus for orthogonal frequency division multiplexing of FIG. 2 using the existing 2-D signal constellation of FIG. 1, a signal to noise ratio $E_S/N_0$ to achieve symbol error rate $P_s=10^{-4.5}$ (−4.5 when being represented in a log type) is 19.9 dB.

On the other hand, in the case of the apparatus for orthogonal frequency division multiplexing of FIG. 3 using the 3-D 8-lay signal constellation of FIG. 6, a signal to noise ratio $E_S/N_0$ to achieve symbol error rate $P_s=10^{-4.5}$ is 14.1 dB. Therefore, it can be confirmed that the transmission power is reduced by about 6 dB in a transmitter.

As described above, the apparatus for orthogonal frequency division multiplexing using the 3-D signal constellation for signal mapping can show excellent performance in view of the signal to noise ratio and can use the remarkably reduced transmission power in the same reference symbol error rate, as compared to the existing orthogonal division multiplexing using the 2-D signal constellation for signal mapping.

In addition, the 3-D signal constellation of the above-mentioned sphere inscribed polyhedron scheme are configured as the vertex coordinates of the regular polyhedron inscribing to the sphere such that all the signal points have the same power, thereby having the constant amplitude characteristics. Generally, when the signal points disposed on the single sphere have the same distance from the original point, the constant amplitude characteristics are shown.

However, the constellation having the constant amplitude characteristics are limited to the signal constellation shown in FIGS. 4 and 6 while geometrically drawing and they can transmit only 2 bits and 3 bits per a o signal point. For this, it is disadvantageous in high-speed data transmission. That is, it is impossible to geometrically draw the regular polyhedron that has the number of vertices larger than 8 and corresponds to a multiplier of 2 and thus, it is impossible to implement the 3-D signal constellation capable of allocating 4 bits or more to each sub-channel.

In other words, all the signal points are corresponding to the vertices of the regular tetrahedron and the regular hexahedron inscribing to the 3-D sphere on the 3-D signal constellation shown in FIGS. 4 and 6. Therefore, the signal constellation is corresponding to four and eight signal points having the same amplitudes, respectively, and the number of bits that can be allocated to each sub-channel becomes 2 bits and 3 bits according to the above-mentioned Equation 2.

In order to supplement the disadvantages, the present invention applies the basic type 3-D signal constellation shown in FIGS. 4 and 6 to provide the method for implementing the signal constellation capable of transmitting 4 bits per a signal point. In more detail, the method for implementing the cube-in-cube 3-D signal constellation and the concatenated tetrahedron type signal constellation is proposed.

Figure 10:
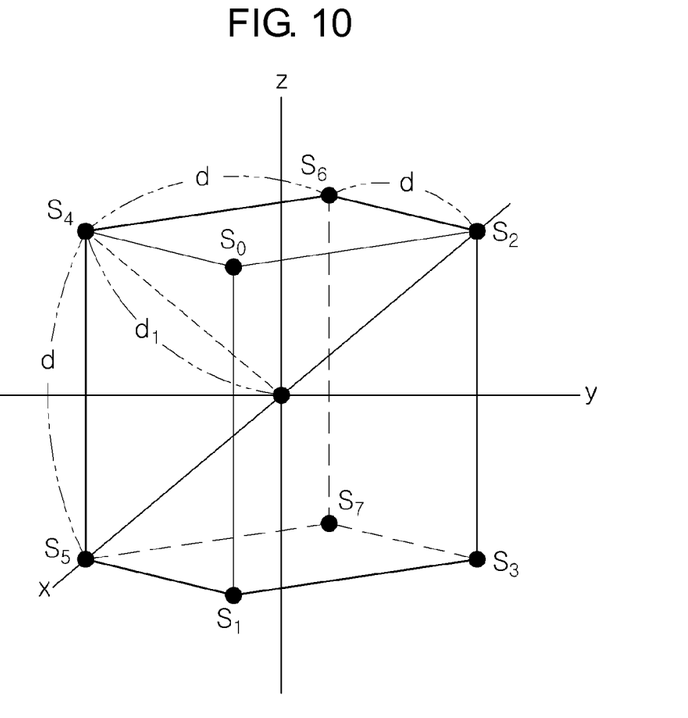
FIGS. 10 and 11 are diagrams for explaining a method for implementing 3-D 16-ary signal constellation (cube-in-cube) according to an exemplary embodiment of the present invention.
Figure 11:
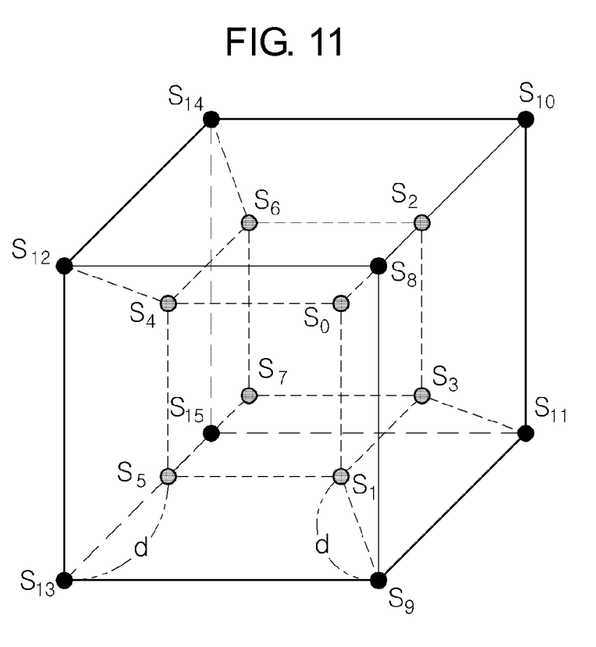

FIGS. 10 and 11 are diagrams for explaining a method for implementing 3-D 16-ary signal constellation (cube-in-cube) according to an exemplary embodiment of the present invention. In this case, FIG. 10 shows the basic type signal constellation necessary to implement the cube-in-cube signal constellation of FIG. 11.

First, as shown in FIG. 10, the regular hexahedron signal constellation inscribing to the virtual sphere of which radius is $d_1$ are drawn. The signal constellation shown in FIG. 10 are the 3-D 8-lay signal constellation using 8 vertices of the regular hexahedron inscribing to the sphere likewise the signal constellation shown in FIG. 6. Herein, a symbol $S_i (0 \leq i \leq 7)$ representing each signal points is represented for convenience of explanation and all the signal points are symmetrical based on the central point of the sphere and the sequence thereof may be changed.

In FIG. 10, the polyhedron inscribing to the virtual sphere of which radius is $d_1$ is the regular hexahedron, any signal point and three signal points adjacent thereto are spaced by a distance d. The distance from an original point (0, 0, 0) to the signal points is the same as the radius of the sphere.

Next, the radius from the original point draws a new virtual sphere of which radius is $d_2$ (=$d_1$+d). In this case, the central point of the newly drawn sphere is the same as the central point of which radius is $d_1$ in FIG. 10 (for example, original point) so that the inner sphere and the external sphere becomes a concentric sphere and the radius is $d_2$ so that the distance between any signal point contacting the inner sphere and the signal points adjacent thereto becomes d (see FIG. 11). For example, $S_0$, $S_5$, $S_6$, and $S_{12}$ adjacent to $S_4$ are spaced by the same distance d from $S_4$.

In other words, straight lines connecting the central point of the inner sphere to each signal point (8) extends to the outside by the distance d and the intersecting point intersecting with the sphere of which radius is $d_2$ (=$d_1$+d) is defined as the signal point, thereby implementing the 3-D 16-ary signal constellation configured as 16 signal points. In this case, the center of the outer sphere is the same as the central point of the inner sphere.

It has a structure where the signal point positioned at the inner sphere is adjacent to four signal points positioned at the same distance d. Therefore, since the signal points of $S_0$, $S_1$, $S_2$, $S_3$, $S_4$, $S_5$, $S_6$, and $S_7$ positioned at the inner sphere among 16 signal points of FIG. 11 are at all the same distance $d_1$ from the original point (0, 0, 0), they have the same amplitude $d_1$ and since all of 8 signal points other than the signal points listed from 16 signal points are in the same distance $d_2$ from the original point of the 3-D space, it has the same amplitude $d_2$. The above-mentioned drawing method has an advantage of maximally suppressing the use of Equation. In the present invention, the 3-D 16-ary signal constellation implemented through the above-mentioned method is referred to as the cube-in-cube 3-D 16-ary signal constellation.

Figure 12:
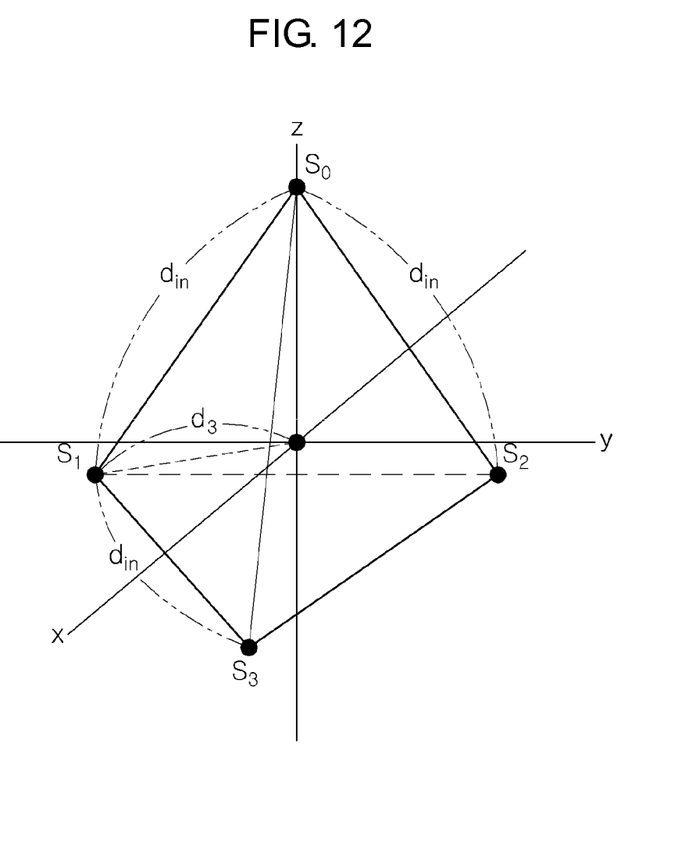
FIGS. 12 and 13 are diagrams for explaining 3-D 16-ary signal constellation (concatenated tetrahedron) according to another exemplary embodiment of the present invention.
Figure 13:
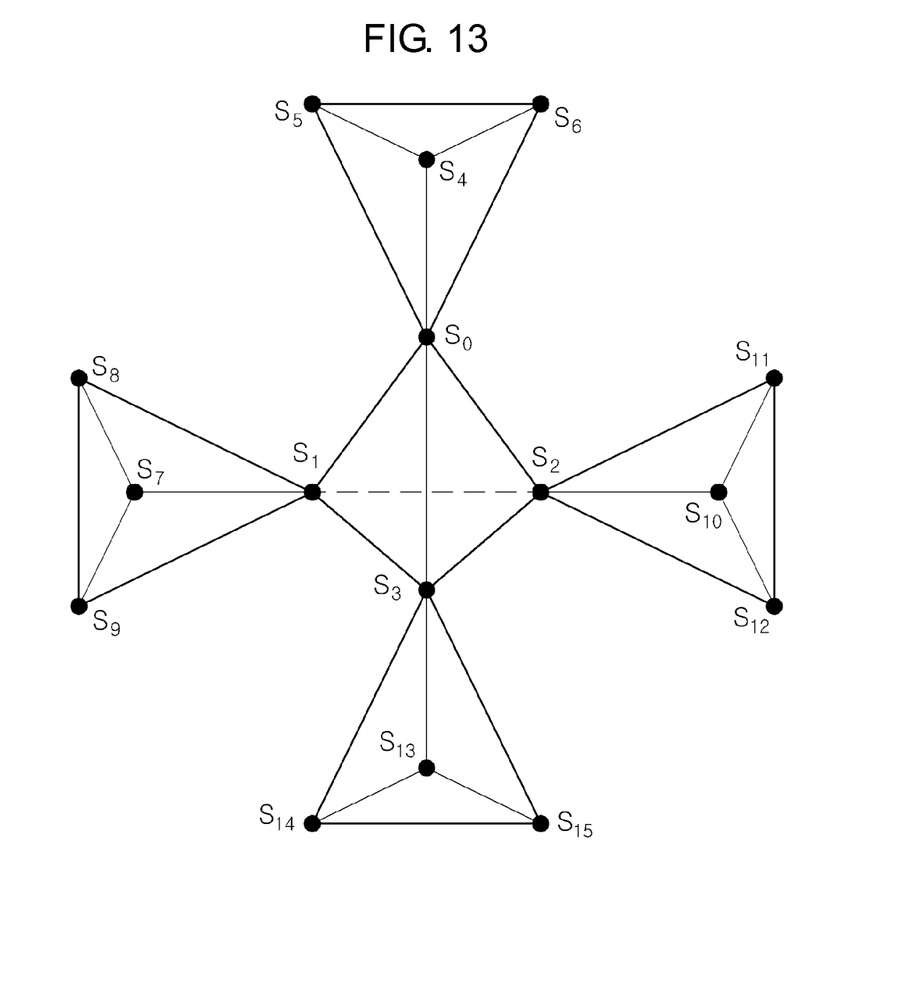

FIGS. 12 and 13 are diagrams for explaining 3-D 16-ary signal constellation (concatenated tetrahedron) according to another exemplary embodiment of the present invention. FIG. 12 shows the basic type signal constellation necessary to implement the concatenated tetrahedron signal constellation of FIG. 13.

First, as shown in FIG. 12, the regular tetrahedron signal constellation inscribing to the virtual sphere of which radius is $d_3$ are drawn. The signal constellation shown in FIG. 12 are the 3-D 4-lay signal constellation using four vertices of the regular tetrahedron inscribing to the sphere likewise the signal constellation shown in FIG. 4. Herein, a symbol $S_i(0 \leq i \leq 3)$ representing each signal points is represented for convenience of explanation and all the signal points are symmetrical based on the central point of the sphere and the sequence thereof may be changed.

In FIG. 12, the polyhedron inscribing to the virtual sphere of which radius is $d_3$ is the regular tetrahedron, any signal point and three signal points adjacent thereto are spaced by a distance $d_{in}$. For example, the spaced distance between three signal points $S_1$, S2, and $S_3$ adjacent to the signal point $S_0$ and the signal point $S_0$ is the same as $d_{in}$ in FIG. 12. The distance from the central point (for example, original point) to each signal point is the same as the radius $d_3$ of the sphere.

Next, the new sphere having the radius d contacting each vertex of the regular tetrahedron inscribing to the virtual sphere of FIG. 12 is drawn to form new four spheres having the same size where any one point of the sphere contacts four vertices of the regular tetrahedron. In this case, the radius $d_4$ of the newly formed sphere is larger than the radius $d_3$ and smaller than infinity ∞. Four new spheres drawing at the outside should be drawn not to overlap with each other, such that the distance D between the central points of the newly formed external spheres should be larger than $2*d_4$. That is, the outer sphere contacting each vertex of the regular tetrahedron is drawn in order to meet $D>2*d_4$.

Next, the regular tetrahedron inscribing to four spheres positioned at the outside is each drawn and the vertices contacting each sphere is defined as the signal point (see FIG. 13). Herein, if it is assumed that the distance between the vertices of the regular tetrahedron drawn at the outside is $d_5$, the distance $d_{out}$ between the signal point belonging to any outer sphere and the signal point belonging to other outer spheres is equal to or larger than the distance $d_5$ between the signal points in the outer sphere. In other words, the condition of $d_5 \leq d_{out}$ should be met. Any one of the signal points of the outer sphere conforms to any one of the signal points of the inner sphere. In the present invention, the 3-D 16-ary signal constellation implemented through the above-mentioned method is referred to as the concatenated. tetrahedron 3-D 16-ary signal constellation.

Meanwhile, the average power of the 16-ary signal constellation implemented through the above-mentioned methods may he calculated as the following Equation 5.

$$P_{ave} = \frac{1}{16}\sum_{i=0}^{15} P_{s_i} = \frac{1}{16}\sum_{i=0}^{15}(x_i^2 + y_i^2 + z_i^2), \text{(Unit: watt)} \quad \text{[Equation 5]}$$

Where $P_{x_i}$ is a power owned by the signal point $S_1$ at the signal constellation according to an exemplary embodiment of the present invention. $x_i$, $y_i$, and $z_i$ represent the 3-D axial coordinate values of the signal point $S_i$.

Therefore, Equation 5 becomes the average power of the signal constellation calculated by defining the central point of the concentric sphere as (x, y, z)=(0, 0, 0). The average power of the above-mentioned calculated signal constellation is used as normalization constant when there is a need to control the coordinate values in order for the signal constellation to have the average power of the specific value.

For example, in order to perform normalization for the 3-D 16-ary signal constellation having the non-constant amplitude characteristics according to an exemplary embodiment of the present invention to have the average power of 1 watt, the normalization constant is applied to obtain new coordinates $(x'_i, y'_i, z'_i)$ for each signal point by applying the normalization constant as in the following Equation 6. The non-constant envelop characteristics show the case where the amplitude is different according to the signal point when there are signal points in two concentric spheres (that is, the case where the distance between the signal points from the central point is not same) as in the cube-in-cube signal constellation of FIG. 11.

$$(x'_i, y'_i, z'_i) = \left( \frac{x_i}{\sqrt{P_{ave}}}, \frac{y_i}{\sqrt{P_{ave}}}, \frac{z_i}{\sqrt{P_{ave}}} \right) \quad \text{[Equation 6]}$$

Figure 14:
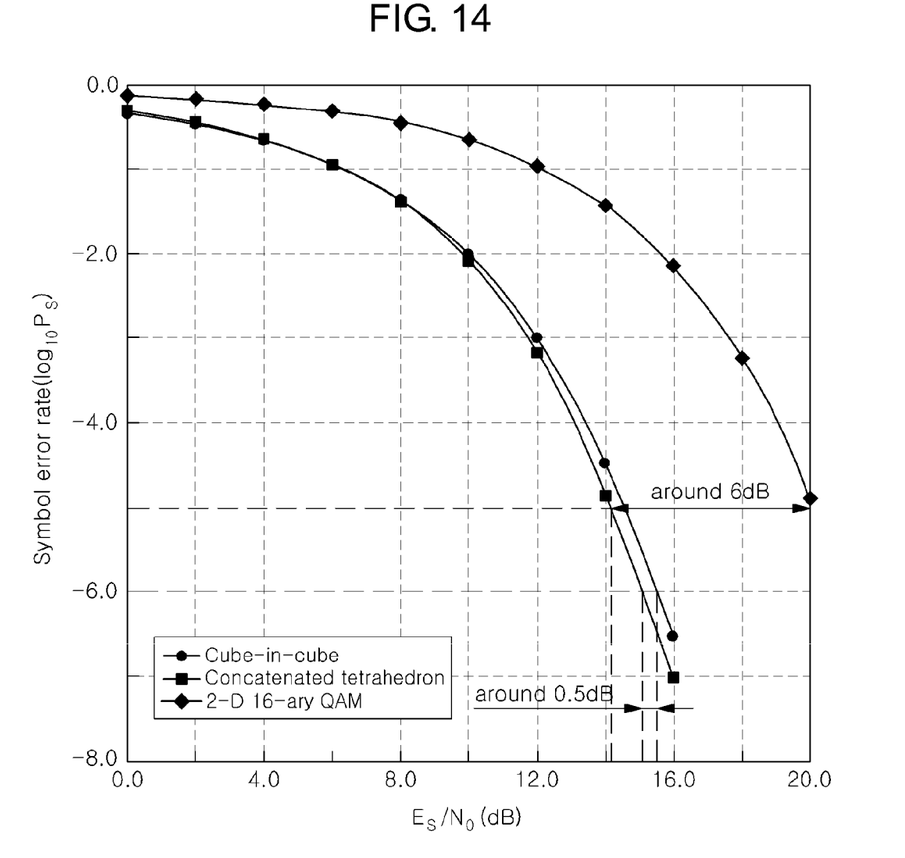
FIG. 14 is a diagram showing the symbol error rate of the apparatus for orthogonal frequency division multiplexing of FIG. 3 using 3-D 16-ary signal constellation according to an exemplary embodiment of the present invention.

FIG. 14 shows the symbol error rate (SER) of the apparatus for orthogonal frequency division multiplexing of FIG. 3 using the cube-in-cube 3-D 16-ary signal constellation according to an exemplary embodiment of the present invention, the symbol error rate of the apparatus for orthogonal frequency division multiplexing of FIG. 3 using the concatenated tetrahedron 3-D 16-ary signal constellation according to another exemplary embodiment of the present invention, and the symbol error rate of the apparatus for quadrature amplitude modulation (QAM) using the existing 2-D 16-ary signal constellation.

Referring to FIG. 14, when the reference symbol error rate is defined as $10^{-6}$ for comparison, it can be confirmed that the apparatus for orthogonal frequency division multiplexing to which the concatenated tetrahedron signal constellation is applied has excellent performance by about 0.5 dB in view of $E_S/N_0$ representing the signal-to-noise power ratio as compared to the apparatus for orthogonal frequency division multiplexing apparatus to which the cube-in-cube signal constellation is applied.

Further, the apparatus for orthogonal frequency division multiplexing to which the cube-in-cube signal constellation according to an exemplary embodiment of the present invention is applied has excellent performance by about 6 dB as compared to the apparatus for orthogonal amplitude modulation to which the 2-D 16-ary signal constellation shown in FIG. 1B are applied, when the cube-in-cube signal constellation according to an exemplary embodiment of the present invention is applied, when the reference symbol error is about $10^{-5}$. Generally, in the digital communication system, the difference in performance as much is considered as very surprisingly performance improvement.

As set forth above, the present invention relates the apparatus for electrical signal conversion applied prior to modulating the binary information generated from the digital information source to the signal of the carrier frequency band and the signal constellation for this. This is used as the core components of the digital communication system. The 3-D 16-ary signal constellation having the non-constant envelop characteristics according to an exemplary embodiment of the present invention can be applied to the general digital communication system and can also be applied to the polarization shift keying system for high-speed wireless communication and optical communication.

Some steps of the present invention can be implemented as a computer-readable code in a computer-readable recording medium. The computer-readable recording media include all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, an optical magnetic storage device, etc., and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

As described above, the preferred embodiments have been described and illustrated in the drawings and the description. Herein, specific terms have been used, but are just used for the purpose of describing the present invention and are not used for qualifying the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

The invention claimed is:

1. An apparatus for 3-D orthogonal frequency division multiplexing, comprising:
    a serial-to-parallel converter configured to parallelize a serial input signal into N parallel input signals;
    a 3-D signal mapper configured to map the N parallel input signals to 3-D coordinate points of a cube-in-cube signal constellation, respectively; and
    a 2-D inverse Fourier transform unit configured to generate a 2-D matrix based on the N mapped 3-D coordinate points and perform 2-D inverse Fourier transform.

2. The apparatus for 3-D orthogonal frequency division multiplexing according to claim 1, wherein the cube-in-cube signal constellation is a 16-ary cube-in-cube signal constellation.

3. The apparatus for 3-D orthogonal frequency division multiplexing according to claim 1, wherein the cube-in-cube signal constellation has non-constant amplitude characteristics.

4. The apparatus for 3-D orthogonal frequency division multiplexing according to claim 1, wherein the cube-in-cube signal constellation is a 16-ary 3-D cube-in-cube signal constellation having 16 signal points corresponding to an inner regular hexahedron and an outer regular hexahedron, both of them having a central point of a 3-D orthogonal coordinate system as a center of gravity.

5. The apparatus for 3-D orthogonal frequency division multiplexing according to claim 4, wherein the signal points of the outer regular hexahedron are located on 8 straight lines each of which connects the center of gravity with each signal point of the inner regular hexahedron.

6. The apparatus for 3-D orthogonal frequency division multiplexing according to claim 1, further comprising a parallel-to-serial converter configured to convert the inverse Fourier transformed parallel signals into serial signals and output the serial signals.

7. An apparatus for 3-D orthogonal frequency division multiplexing, comprising:
    a serial-to-parallel converter configured to parallelize a serial input signal into N parallel input signals;
    a 3-D signal mapper configured to map the N parallel input signals to 3-D coordinate points of a concatenated tetrahedron signal constellation, respectively; and a 2-D inverse Fourier transform unit configured to generate a 2-D matrix based on the N mapped 3-D coordinate points and perform 2-D inverse Fourier transform.

8. The apparatus for 3-D orthogonal frequency division multiplexing according to claim 7, wherein the concatenated tetrahedron signal constellation has non-constant amplitude characteristics.

9. The apparatus for 3-D orthogonal frequency division multiplexing according to claim 7, wherein the concatenated tetrahedron signal constellation is 16-ary 3-D signal constellation having 16 signal points corresponding to an inner regular tetrahedron and 4 outer regular tetrahedrons each of which shares one vertex with the inner regular tetrahedron and has a center of gravity positioned at the outside of the inner regular tetrahedron, the inner regular tetrahedron having a central point of a 3-D orthogonal coordinate system as a center of gravity.

10. The apparatus for 3-D orthogonal frequency division multiplexing according to claim 9, wherein the distance between a signal point belonging to any one outer regular tetrahedron and a signal point belonging to another outer regular tetrahedron among the 4 outer regular tetrahedrons is equal to or longer than the distance between signal points in the any one outer regular tetrahedron.

* * * * *